US012598195B2

(12) United States Patent
Kneib et al.

(10) Patent No.: US 12,598,195 B2
(45) Date of Patent: Apr. 7, 2026

(54) FRAME INVALIDATION IN BUS SYSTEM VIA RECEIVE LINE

(71) Applicant: Robert Bosch GmbH, Stuttgart (DE)

(72) Inventors: Marcel Kneib, Ingelheim (DE); Oleg Schell, Krautheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 619 days.

(21) Appl. No.: 17/860,931

(22) Filed: Jul. 8, 2022

(65) Prior Publication Data

US 2023/0013980 A1     Jan. 19, 2023

(30) Foreign Application Priority Data

Jul. 19, 2021     (DE) ..................... 10 2021 207 685.8

(51) Int. Cl.
H04L 9/40          (2022.01)
H04L 12/40         (2006.01)

(52) U.S. Cl.
CPC .......... H04L 63/1416 (2013.01); H04L 12/40 (2013.01)

(58) Field of Classification Search
CPC ............... H04L 12/40; H04L 12/40026; H04L 63/1416
USPC ......................................................... 726/23
See application file for complete search history.

(56) References Cited

U.S. PATENT DOCUMENTS

| | | | | |
|---|---|---|---|---|
| 7,418,732 B2 * | 8/2008 | Campbell | ............. | H04L 63/145 |
| | | | | 726/23 |
| 10,361,934 B2 | 7/2019 | Elend et al. | | |
| 12,074,888 B2 * | 8/2024 | Kim | .................... | H04L 63/1416 |
| 2005/0207420 A1 * | 9/2005 | Shanklin | ................. | H04L 12/56 |
| | | | | 370/392 |
| 2012/0210430 A1 * | 8/2012 | Boulanger | .......... | H04L 63/1441 |
| | | | | 726/23 |
| 2014/0101764 A1 * | 4/2014 | Montoro | ................. | H04L 67/02 |
| | | | | 726/23 |
| 2014/0185463 A1 * | 7/2014 | Likkei | ..................... | H04L 12/46 |
| | | | | 370/254 |
| 2017/0093659 A1 * | 3/2017 | Elend | .................. | H04L 63/1416 |
| 2017/0134358 A1 * | 5/2017 | Takada | ................ | H04W 12/069 |
| 2018/0189483 A1 * | 7/2018 | Litichever | ............... | G06F 13/36 |
| 2021/0006430 A1 * | 1/2021 | de Haas | ............ | H04L 12/40013 |

OTHER PUBLICATIONS

NPL Search Terms (Year: 2025).*

* cited by examiner

*Primary Examiner* — Syed A Zaidi
(74) *Attorney, Agent, or Firm* — NORTON ROSE FULBRIGHT US LLP

(57)          ABSTRACT
A computer-implemented method for intercepting an intrusion into a bus system. The method includes detecting, by way of an intrusion detection system, a frame sent by a further node of the bus system on a bus of the bus system as an intrusion into the bus system; sending data on a receive line of a node device in order to manipulate a signal, which corresponds to the frame arriving over the bus, on the receive line, the receive line being arranged between a transceiver and a controller of the node device. A node device and a bus system for intercepting an intrusion into the bus system, are also described.

17 Claims, 3 Drawing Sheets

FRAME INVALIDATION IN BUS SYSTEM VIA RECEIVE LINE

BACKGROUND INFORMATION

Bus systems may include a set of one or more lines (the bus), via which a plurality of nodes (at least two) are connected to one another for the purpose of data exchange, each node generally comprising at least one processor. An advantage of bus systems may be seen in the fact that individual lines between any two nodes are avoided. Therefore, bus systems are frequently used when a relatively large number of nodes need to be able to communicate with one another (in accordance with a bus system protocol). A mechatronic technical system may comprise a multiplicity of (electronic) control units which are able to interact via a bus system (or a plurality of bus systems, having one or more gateways, for example). The functionality of such a technical system is often highly dependent on this interaction. For example, even in a non-autonomously driving vehicle, more than one hundred control units (e.g., engine control unit, transmission control unit, anti-lock braking system/electronic stability control, airbag, body control unit, driver assistance systems, car alarm systems, etc.) may be networked via a bus system. The growing digitization and also automation and networking of technical systems may lead to increasingly large bus systems (i.e., with more nodes).

The Controller Area Network (CAN), in which control units of a technical system (e.g., of a vehicle) are connected via a CAN bus and may communicate with one another according to a CAN protocol, is a standardized serial bus system based on the multi-master principle, in which all control units in the CAN are on an equal footing. For example, CAN (now in various versions) and/or CAN-inspired developments may be used in all sorts of mechatronic technical systems (e.g., in the automotive industry, in automation, in elevator systems, in medical technology, in aerospace engineering, in rail vehicle construction, in shipbuilding, etc.).

CAN and/or CAN-inspired developments (abbreviated to CAN, etc.) have been and are being developed in such a way that data transmission over the CAN bus is as far as possible independent of random external interference (in the EMC sense, for example). The CAN bus may be implemented by two twisted wires (CAN_HIGH, CAN_LOW), for example, thus achieving a symmetrical signal transmission. In this way, CAN, etc., has also proved its worth in particular in safety-related areas (e.g., in vehicles), where high data security is important. While CAN, etc., is relatively simple, robust and fast, it may at the same time be vulnerable to targeted attacks and/or manipulations from outside.

As a general rule, such an intrusion into a bus system may include, for example, sending a message (frame) from an additional and unauthorized node of the bus system or from an authorized but infiltrated node of the bus system. Such a message may disrupt communication between the authorized nodes of the bus system. In particular, through deliberate deception (e.g., by specifying an ID/identifier of an authorized node), false messages may then be sent which adversely influence the bus system and the operation of the associated technical system. In the context of the increasing digitization (more interfaces) and the automation and networking of technical systems, bus systems, CAN, etc., thus need to be protected against intrusion.

Intrusion detection systems (IDS) that are designed to detect intrusion into the bus system are available in the related art. Physical characteristics of the individual (authorized) nodes in the bus system are often used here to identify the source of the transmitted message. For example, the clock-based intrusion detection system (CIDS) is based on an individual clock skew of the processor of each node. Alternatively or in addition, individual voltage characteristics of the nodes may be analyzed and identified. A further possibility (e.g., TCAN, TIDAL-CAN, . . . ) consists in, for example, ascertaining a position of the transmitting node in the bus system and, by comparison with the conventional topology/architecture/layout of the bus system, potentially identifying the node as an unauthorized and hence intruding node. One class of intrusion detection systems is implemented by a plurality/multiplicity of intrusion detection (sub)systems, specifically one for each node of the bus system, an intrusion detection (subsystem) of each node being designed to detect misuse of individual IDs/identifiers (i.e., of the respective node). If every node of the bus system has such an intrusion detection (sub)system, intrusion into the bus system from at least one node may be detected.

If an intrusion is detected by the intrusion detection system, it may be logged in a node for documentation and subsequent analysis, for example. Alternatively or in addition, a user (e.g., the driver) of the technical system (e.g., of the vehicle) or another service point may be informed via a user interface. In addition or as an alternative to these passive responses, an active and as immediate as possible a response may be desirable, in particular to prevent a manipulation of the bus system and/or of the associated technical system. To this end, for example, an error message (error frame) may be sent on the bus and hence to all nodes of the bus system.

U.S. Pat. No. 10,361,934 B2 describes specific embodiments of a device and of a method. A CAN device comprises a compare model configured such that it may be connected to a CAN transceiver, the compare module having a receive data (RXD) interface configured to receive data from the CAN transceiver; a CAN decoder configured to decode an identifier of a CAN message received from the RXD interface; and an identifier memory configured to store an entry that corresponds to at least one identifier; and compare logic configured to compare a received identifier from a CAN message with the entry that is stored in the identification memory and to output a match signal when the comparison indicates that the received identifier of the CAN message matches the entry that is stored at the CAN device. The CAN device also includes a signal generator configured to output, in response to the match signal, a signal to invalidate the CAN message.

SUMMARY

A first general aspect of the present invention relates to a computer-implemented method for intercepting an intrusion into a bus system. According to an example embodiment of the present invention, the method includes detecting, by way of an intrusion detection system (IDS), a frame sent by a further node of the bus system on a bus of the bus system as an intrusion into the bus system. The method further comprises sending data on a receive line of a node device in order to manipulate a signal, which corresponds to the frame arriving over the bus, on the receive line, the receive line being arranged between a transceiver and a controller of the node device. The signal may be manipulated in such a way here that each one of a number of recessive bits arriving over the bus is overwritten with a dominant bit, and/or a level on the receive line is set to a specific level over a period of time.

In this way, a sequence of directly successive dominant bits may be generated, which is received by the controller of the node device. In accordance with a bus system protocol, the sequence of directly successive dominant bits may trigger the controller of the node device of the bus system to send an error frame on the bus, causing the transmission of the frame detected as an intrusion to be invalidated, and in particular suppressed, and the intrusion into the bus system is thus intercepted.

A second general aspect of the present invention relates to a node device for a bus system. According to an example embodiment of the present invention, the node device includes a transceiver which is designed to be connected to a bus of the bus system. The node device further comprises a controller, which is connected to the transceiver via a transmit line and via a receive line, the controller and the transceiver being designed to transmit data from the controller to the transceiver over the transmit line and from the transceiver to the controller over the receive line. The node device further comprises a processor. The node device further comprises, optionally, an intrusion detection system (IDS). The node device is designed to execute the method for intercepting an intrusion into the bus system according to the first general aspect (or according to a specific embodiment thereof).

A third general aspect of the present invention relates to a bus system. According to an example embodiment of the present invention, the bus system includes a bus and at least one node device according to the second general aspect (or according to a specific embodiment thereof), which is connected to the bus via the transceiver of the at least one node device. The bus system further comprises at least one further node of the bus system, each further node of the bus system comprising a further transceiver, a further controller and a further processor. The bus system further comprises, optionally, at least one further node as a third node of the bus system.

An advantage of the method according to the first aspect (or a specific embodiment thereof) may be seen in the fact that a/the signal is manipulated on the receive line and not exclusively on the transmit line, for example, the transmit line likewise being arranged between the transceiver and the controller of the node device. It is possible in principle, by way of a corresponding manipulation to intercept a detected intrusion, for example, to send a sequence of directly successive dominant bits on the transmit line, in order to generate an error frame on the bus of the bus system in accordance with the bus system protocol, for example (possibly by way of a controller of a further node of the bus system), and hence to intercept the intrusion into the bus system. However, the possibility of writing directly on the bus in this way (i.e., writing via the transceiver, rather than via the controller) may be dangerous, because the entire bus and hence the entire bus system could be blocked or shut down, due to the constantly high level, for example. In other words, such a possibility may potentially (if it cannot be prevented by design measures, for example) represent an entry point for a destructive intrusion into the bus system, even though this possibility was actually to secure the bus system. By contrast, the method according to the first aspect (or a specific embodiment thereof) is protected against such a destructive intrusion. In this case, the sequence of directly successive dominant bits (or, more generally, a result of the manipulation to intercept a detected intrusion) which is sent on the receive line is processed by the controller of the node device in accordance with the bus system protocol. Thus, while an error frame may be sent on the bus to inform the further nodes of the bus system about the detected intruder frame, the bus may not be permanently blocked or shut down. Manipulating the signal on the receive line in order to intercept an intrusion may thus be considered to be safer.

Moreover, writing on the receive line (and where necessary on the transmit line) requires only minimal hardware. In fact, all that is required is a line section and an interface (e.g., a general-purpose input/output port (GPIO)) of a processor (not necessarily the processor of the at least one node device). If the processor with the interface is the processor of the at least one node device, the line section may be regarded as a controller bypass line, because the controller is circumvented. Particularly in comparison with a node device of a conventional bus system, only a slight and inexpensive hardware modification is needed, especially if the intrusion detection system (IDS) is implemented in the processor of the at least one node device. Indeed, no additional compare module, for example, is then required. In particular, moreover, no modification of the controller of the node device or of the bus system protocol of the conventional bus system is necessary. That is advantageous insofar as bus systems and the associated bus system protocol (e.g., CAN protocol) are often standardized and may not be modified as often/as quickly as might be desired. In addition, controller bypass lines are not used in most cases (i.e., with no intrusion), and so the functionality of the bus system does not change in most cases.

Furthermore, according to an example embodiment of the present invention, it is particularly advantageous that for the computer-implemented method according to the first aspect (or a specific embodiment thereof) for intercepting an intrusion into the bus system (and in particular by way of the intrusion detection system (IDS)), it is sufficient to add a controller bypass line only to the at least one node of the bus system, for example. In other words, an existing bus system may be modified simply by way of a corresponding modification of a single node or simply by adding a node according to the second general aspect (or a specific embodiment thereof) to a bus system according to the third general aspect. In this way, an intrusion into the entire bus system may be intercepted simply by the method according to the first general aspect (or a specific embodiment thereof). This allows for a simple and inexpensive integration into existing bus systems.

Writing on the receive line means that the interception of the intrusion, in particular of the frame of the intruder node, is not tied to the bus system protocol. An intruder frame may thus be intercepted (invalidated) before an end-of-frame field, and hence very quickly. In particular, this enables any compromise and/or impairment of the operation of the technical system (e.g., the vehicle) to be prevented in a timely manner.

The sending of an error frame to the other nodes in the bus system, for example, in association with the interception, likewise follows from the existing bus system protocol.

The processor of the at least one node device may include the intrusion detection system (IDS). Additional, separate processors for the intrusion detection system (IDS) may be avoided in this way and costs reduced.

DETAILED DESCRIPTION OF EXAMPLE EMBODIMENTS

Figure 1A:
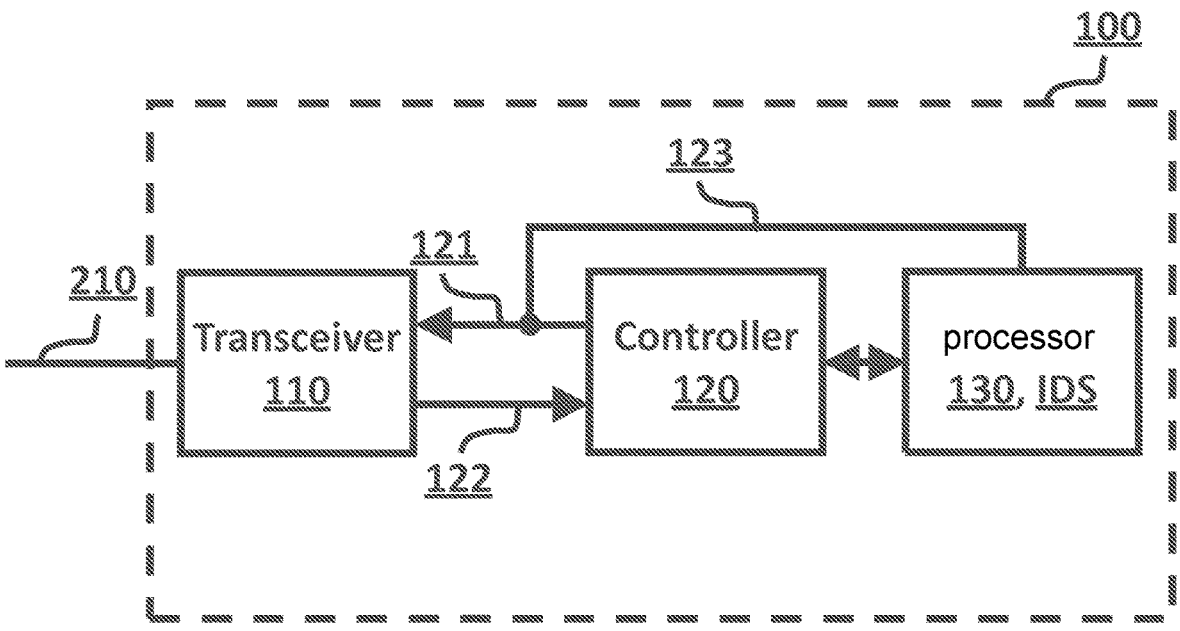
FIG. 1A shows a node device for a bus system with a controller bypass line to the transmit line.

The computer-implemented method 300, the node device 100, and the bus system 200 are aimed at detecting and intercepting an intrusion into the bus system 200. The bus systems of the present invention may be used in many mechatronic technical systems and in various fields (for example, in the systems or applications listed in the Background Information section, e.g., in a vehicle). A secure interaction between nodes of such a bus system is often critical for the (intended, specified) functionality of the technical system. For example, even in a non-autonomously driving vehicle, more than one hundred control units (e.g., engine control unit, transmission control unit, anti-lock braking system/electronic stability control, airbag, body control unit, driver assistance systems, car alarm systems, etc.) may be networked via a bus system. For example, if a control unit that had been infiltrated via a multimedia interface, for example, was able to send false signals (e.g., deliberately overly short distances to another road user in front) over the bus system to the other control units, an unintended and possibly damaging system response could be triggered (e.g., initiation of an emergency braking maneuver by an adaptive cruise control system). The growing digitization and also automation and networking of technical systems may lead to increasingly large bus systems (i.e., with more nodes). Intrusion detection system (IDS), as presented in the related art, may detect an intrusion into the bus system and may be used in the systems of the present disclosure.

According to an example embodiment of the present invention, a computer-implemented method 300 is provided for intercepting an intrusion into a bus system 200, said method comprising detecting 310, by way of an intrusion detection system (IDS) (e.g., one or more of the intrusion detection systems described in the Background Information section), a frame (message) sent by a further node 140 of bus system 200 on a bus 210 of bus system 200 as an intrusion into bus system 200. A tap into bus system 200 (even without a dedicated node device for the bus system), in particular into bus 210, may be regarded as a further node 140. Method 300 further comprises sending 320 data on a receive line 122 of a node device 100 to manipulate a signal, which corresponds to the frame arriving over bus 210, on receive line 122 (in order to intercept the intrusion, i.e., the external manipulation), receive line 122 being arranged between a transceiver 110 (transmitter-receiver) and a controller 120 (control unit) of node device 100.

In general, a manipulation may include feeding in a specific data sequence and/or a specific level (e.g., a specific level for a specific period of time) on receive line 122.

The signal that corresponds to the frame arriving over bus 210 may comprise a frame, i.e., a bit sequence, for example, wherein according to the bus system protocol, further bits not belonging to the frame may be inserted into the bit sequence, for example. In the case of a bit sequence, a manipulation of the signal may include changing (toggling) at least one bit of the bit sequence. A signal may be transformed into a bit sequence. The signal may be manipulated in such a way that each one of a number of recessive bits arriving over bus 210 is overwritten with a dominant bit. The incoming recessive bits may arrive in chronological order, but they do not have to arrive in direct chronological order because dominant bits may arrive between the recessive bits.

In addition or alternatively, the manipulation of the signal may involve setting receive line 122 to a dominant level over a period of time (the dominant level over this period of time corresponding for example to a sequence of one or more dominant bits). In this case, both the recessive and the dominant bits may then each be overwritten with a dominant bit. There is no need to check here whether incoming bits are dominant or recessive.

Figure 5:
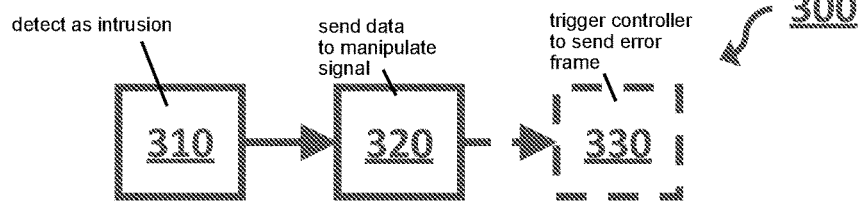
FIG. 5 shows a schematic illustration of a computer-implemented method for intercepting an intrusion into a bus system, according to an example embodiment of the present invention.

In this case, a sequence of directly successive dominant bits may be generated, which is received by controller 120 of node device 100. Method 300 is illustrated schematically in FIG. 5.

In accordance with a bus system protocol (e.g., CAN protocol), the sequence of directly successive dominant bits may trigger 330 controller 120 of node device 100 of bus system 200 to send an error frame on bus 210, causing the transmission of the frame detected as an intrusion to be invalidated, and in particular suppressed, and the intrusion into bus system 200 is thus intercepted. In other words, in contrast to conventional methods in the related art, the sending of the error frame does not have to be actively controlled, since it follows automatically from the bus system protocol. In a CAN protocol, for example, a level change must take place after five bits of the same value (e.g., stuffing rule). Otherwise, an error frame has to be output. For example, the sequence of directly successive dominant bits may be generated via controller bypass line 124, independently of the controller and the bus system protocol, and hence quickly. In this way, an intruder frame may be quickly intercepted/invalidated, in particular before the end-of-frame field of the intruder frame (and after arbitration, for example). Otherwise, i.e., if the bus system protocol were not bypassed, an error frame could be sent on the bus at the earliest with the end-of-frame field, and thus only after almost complete transmission (an end-of-frame field is usually towards the end of the frame) of the intruder frame, in order to notify the other nodes. The earlier an intruder frame may be detected and suppressed, the sooner, bearing in mind the (not insignificant) signal runtimes on bus 210, the other nodes of bus system 200 may be notified and protected from harm.

The sequence of directly successive dominant bits may lead to a negative result of a cyclic redundancy check (CRC) in controller 120 of node device 100. Consequently, controller 120 may be triggered 330 to send the error frame on bus 210 in accordance with the bus system protocol.

The intrusion detection system (IDS) may be designed to detect an intrusion into bus system 200. The intrusion detection system (IDS) may be designed to detect an intrusion into bus system 200 where a further node of bus system 200, in particular further node 140 of bus system 200, sends a frame with an identifier that is assigned to a third node 141 of bus system 200 on bus 210, the third node 141 of bus system 200 being arranged outside node device 100 (i.e., it does not correspond to the node of node device 100). The intrusion detection system (IDS) may (in addition) be designed to detect an intrusion into bus system 200 where a further node 140 of bus system 200 sends a frame with an identifier that is assigned to a third node 141 of bus system 200 on bus 210, the third node 141 of bus system 200 corresponding to the node of node device 100. In other words, the intrusion detection system (IDS) may also be designed to detect misuse of individual identifiers.

Method 300 may be designed in such a way that the frame detected as an intrusion may be invalidated before an end-of-frame field of the frame.

In method 300, the transmission 320 of the data on receive line 122 may originate from a processor 130 of node device 100, processor 130 being connected to transceiver 110 via a/the controller bypass line 124, receive line 122 and controller bypass line 124 having a common line segment. In other words, controller bypass line 124 (or part thereof) joins receive line 122.

Processor 130 of node device 100 may include the intrusion detection system (IDS).

Also provided according to an example embodiment of the present invention is a node device 100 for a bus system 200, comprising a/the transceiver 110, which is designed to be connected to a/the bus 210 of bus system 200. Node device 100 further comprises a/the controller 120, which is connected to the transceiver via a/the transmit line 121 and via a/the receive line 122, the controller and the transceiver being designed to transmit data from the controller to the transceiver over transmit line 121 and from the transceiver to the controller over receive line 122. Node device 100 further comprises a processor 130, which may be coupled to the controller. Node device 100 further comprises, optionally, an/the intrusion detection system (IDS). Node device 100 is designed to execute method 300 for intercepting an intrusion into bus system 200. Processor 130 of node device 100 may be designed to execute method 300 for intercepting an intrusion into bus system 200.

Processor 130 may be connected, as shown in FIGS. 1A-2B (e.g., via a general-purpose input/output port (GPIO port)), via at least one controller bypass line 123, 124 to transceiver 110, and may in addition be designed to intercept, by way of the at least one controller bypass line 123, 124, an intrusion into bus system 200 detected by the intrusion detection system (IDS). In particular, processor 130 may be connected to transceiver 110 by the at least one controller bypass line 123, 124 (i.e., via transmit line 121 and/or via receive line 122), controller bypass line 123, 124 bypassing controller 120. In method 300, if receive line 122 is not present, the transmission 320 of the data on the receive line (122) may originate from another processor (not shown in FIGS. 1A-2B), which in turn is connected to transceiver 110 and in particular to receive line 122 via another controller bypass line (likewise not shown in FIGS. 1A-2B). Such another processor may be a compare module, for example, which is arranged between transceiver 110 and controller 120 of node device 100, for example.

The advantage of at least one controller bypass line (e.g., 123, 124, other controller bypass line) may be considered to be that in the event of a detected intrusion, data (e.g., a signal corresponding to a frame arriving over bus 210 and/or a signal corresponding to a frame to be sent on bus 210) between transceiver 110 and controller 120 (i.e., on transmit line 121 and/or receive line 122) may be changed by processor 130 or by the other processor at any time. With method 300, an intruder message (frame) may be intercepted quickly in this way, and in particular before the end-of-frame field of the intruder message (and following arbitration, for example), because it is possible in particular also to bypass the bus system protocol by way of the at least one controller bypass line (e.g., 123, 124, other controller bypass line). In this way, a possible intentional damage and/or manipulation by way of the intruder message may be intercepted before it is able to occur.

Processor 130 may comprise all or part of the controller, i.e., the controller may be a logical sub-unit of processor 130. The part of processor 130 that is outside the logical sub-unit may then be connected to transceiver 110 via a controller bypass line 123, 124. Processor 130 may further comprise all or part of the intrusion detection system (IDS). For example, the intrusion detection system (IDS) may be implemented on processor 130, it also being possible for one or more parts (e.g., a repeater) of the intrusion detection system (IDS) to be arranged outside processor 130 (e.g., in bus 210).

Bus system 200 may be, for example, a Controller Area Network, i.e., a CAN (system) (now in various versions), and/or a CAN-inspired development. In this case, bus 210 may be referred to as a CAN bus, transceiver 110 as a CAN transceiver, and controller 120 as a CAN controller. The bus system protocol may in this case be a CAN protocol, e.g., in accordance with ISO 11898-1 or ISO/DIS 11898-1 (e.g., CAN, CAN FD, CAN FEFF, CAN FBFF protocols, etc.). As in the CAN system, for example, the data may correspond to serial bits. Alternatively, bus system 200 may be a Local Interconnect Network (LIN), for example. Alternatively, bus system 200 may be a FLEXRAY network, for example. Processor 130 may be a computer, a central processing unit (CPU) or a microprocessor, for example. In particular, a node may be a control unit (or a part thereof) in a technical system (e.g., in a vehicle).

In one specific embodiment (specific embodiment Tx), transmit line 121 and (the) at least one controller bypass line 123 may have a common line segment. In other words, processor 130 may be connected in this case to transmit line 121, circumventing controller 120. An example of such a specific embodiment is shown in FIG. 1A and, specifically for a CAN, etc., in FIG. 2A.

Figure 1B:
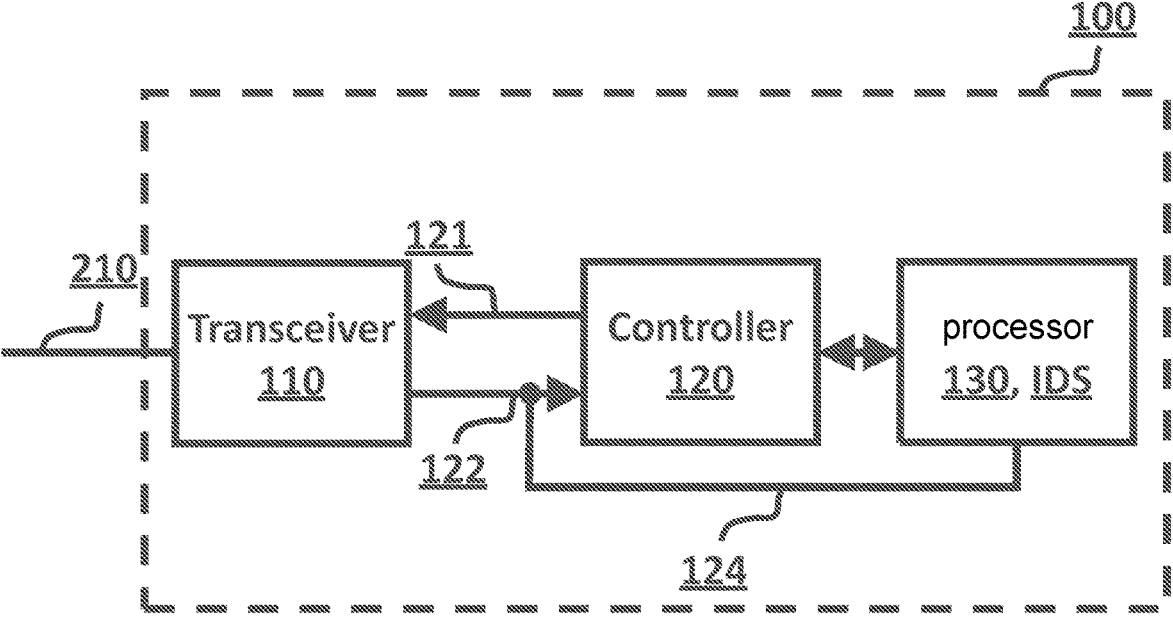
FIG. 1B shows a specific embodiment of a node device for a bus system with a controller bypass line to the receive line.
Figure 2A:
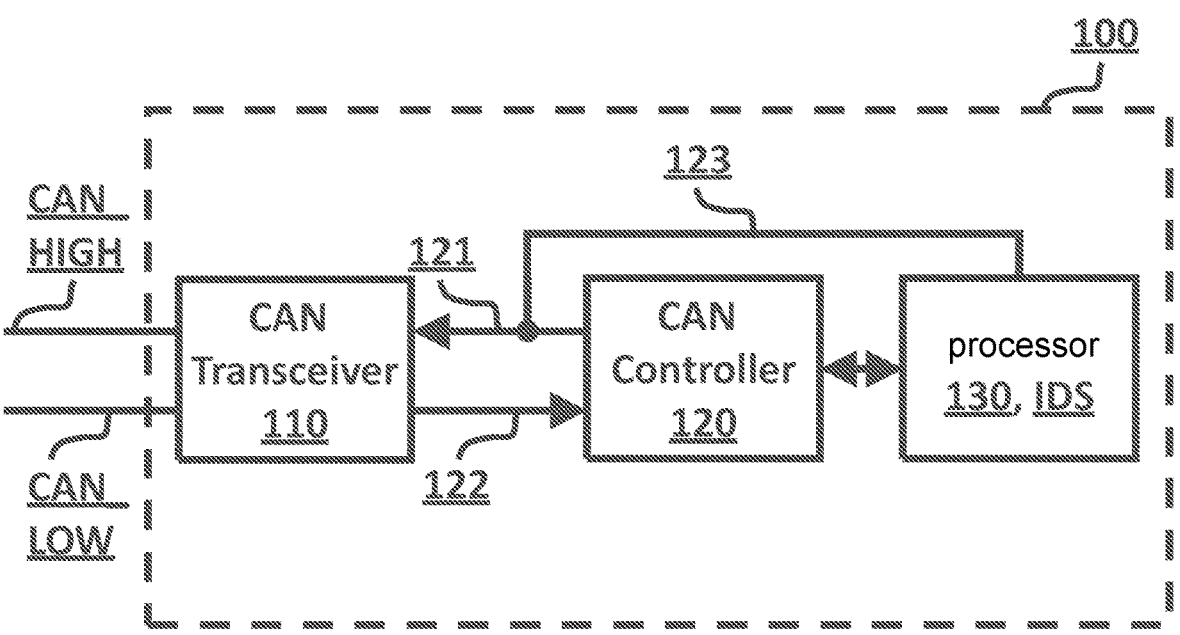
FIG. 2A shows a node device for a Controller Area Network (CAN) with a controller bypass line to the transmit line.
Figure 2B:
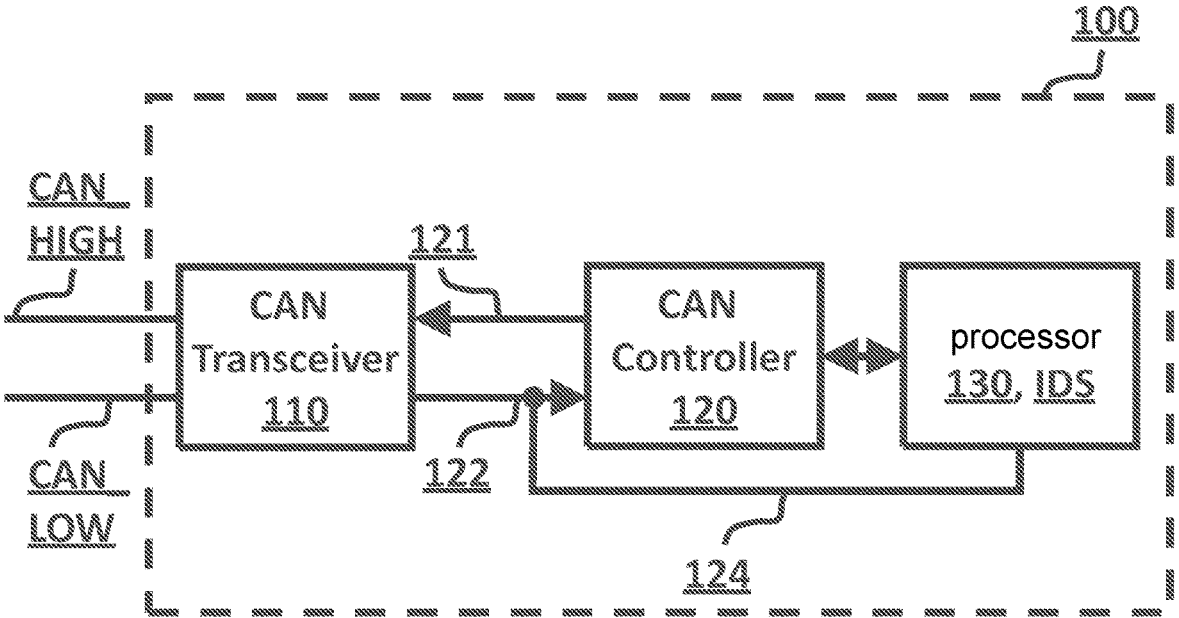
FIG. 2B shows a specific embodiment of a node device for a CAN with a controller bypass line to the receive line.

In a further specific embodiment (specific embodiment Rx), receive line 122 and (the) at least one controller bypass line 124 may have a common line segment. In other words, processor 130 may be connected in this case to receive line 122, circumventing controller 120. An example of such a specific embodiment is shown in FIG. 1B and, specifically for a CAN, etc., in FIG. 2B. Alternatively, a second controller bypass line 124, which has a line segment in common with receive line 122, may also be present. The at least one controller bypass line 123 may then have a line segment in common with transmit line 121, for example. In contrast to what is shown in FIGS. 1A-2B, all or part of the intrusion detection system (IDS) may also be arranged outside processor 130.

Also disclosed is a bus system 200, comprising a bus 210 and at least one node device 100, which is connected to bus 210 via transceiver 110 of the at least one node device 100. Bus system 200 further comprises at least one further node 140 of bus system 200, it being possible for each further node of bus system 200 to comprise a further transceiver, a further controller and a further processor. Optionally, bus system 200 may further comprise at least one further node as a third node 141 of bus system 200.

Figure 3:
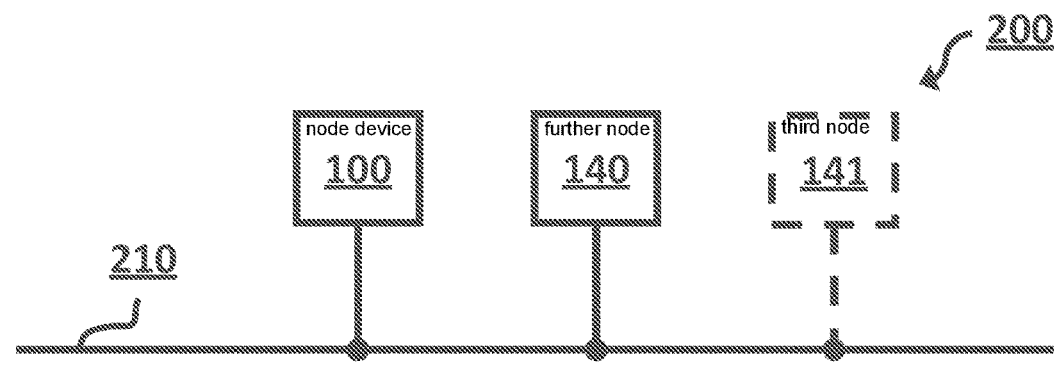
FIG. 3 shows a bus system.
Figure 4:
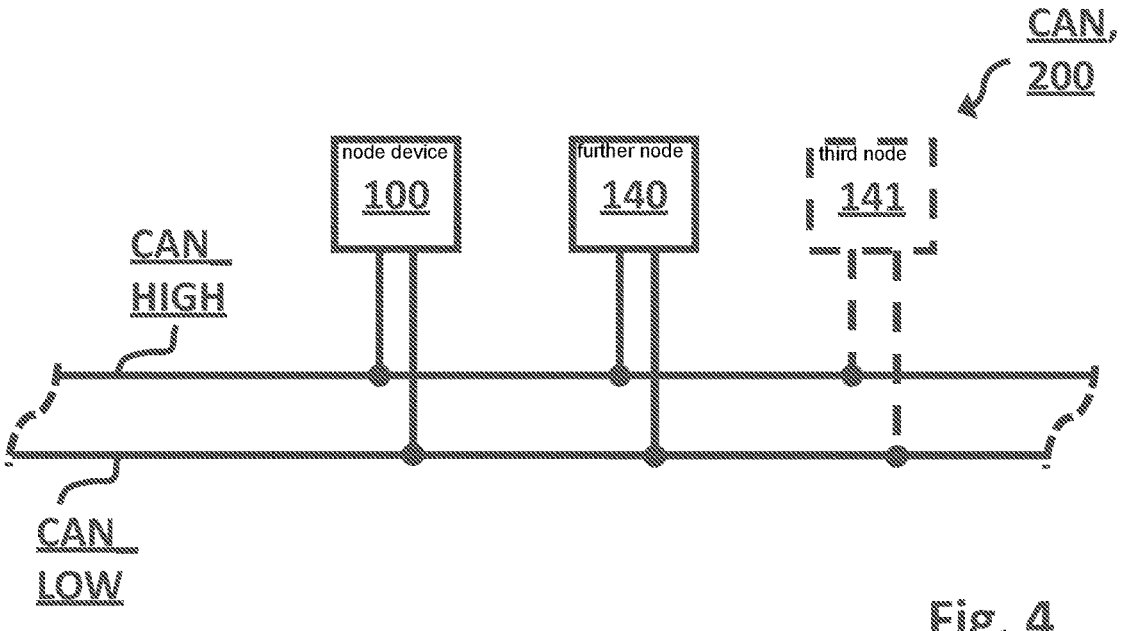
FIG. 4 shows a CAN.

An example of a specific embodiment for bus system 200 is shown in FIG. 3 and, specifically for a CAN, etc., in FIG. 4. The at least one node device 100 may also be, for example, the node of an existing bus system, which is modified or added in order to be able to detect and intercept an intrusion into the existing bus system. In the case of a CAN, etc., in particular the two twisted wires (CAN_HIGH, CAN_LOW) of the CAN bus for symmetrical signal transmission are shown in FIG. 4. By contrast, bus 210 in FIG. 3 (regardless of what is shown) may comprise a set of one or more lines. For example, further node 140 may send a message with an identifier of the node implemented by the at least one node device 100 on bus 210. Alternatively, for example, further node 140 may send a message with an identifier of the (optional) third node 141 on bus 210.

In both cases, such an intrusion may be intercepted by the at least one node device 100 and method 300.

In a specific embodiment Tx of the at least one node device 100, which has already been described, a sequence of directly successive dominant bits (or another manipulation) may (additionally) be sent by transceiver 110 of the at least one node device 100 on bus 210 of bus system 200. Transceiver 110 is not in fact designed/intended to stop the transmission on bus 210. Thus, moreover, at least one controller of a node of bus system 200 may be triggered to send an error frame on the bus. The at least one controller of the node of bus system 200 that is triggered to send an error frame on the bus may be a further controller of further node 140 from which the frame detected as an intrusion (i.e., the intruder frame) is sent, the further controller of further node 140 terminating the transmission of the frame, in accordance with the bus system protocol, before it sends the error frame (likewise in accordance with the bus system protocol) on bus 210 of bus system 200. The error frame may consist, for example, of dominant and/or recessive bits and be dependent on the state of the internal error counter.

Alternatively or in addition, the at least one controller of the node of bus system 200 that is triggered to send an error frame on the bus may be controller 120 of the at least one node device 100 (via transceiver 110 and receive line 122) or a further controller of a further node of bus system 200. In this case, the sequence of directly successive dominant bits in the at least one controller may lead to a negative result of the cyclic redundancy check (CRC) and, in accordance with the bus system protocol, the at least one controller may be triggered to send an/the error frame on bus 210.

Specific embodiment Rx (without specific embodiment Tx), in which the at least one controller bypass line 124 has a line segment in common with receive line 122 and no further controller bypass line 123 has a line segment in common with transmit line 121, may be regarded as being especially secure insofar as it is not possible to write directly on bus 210 of bus system 200 (only via controller 120). Thus, in contrast to specific embodiment Tx, a manipulation with, for example, a constantly high level via the bypass would not be possible. Consequently, it is not possible for bus 210 to be blocked or shut down via the at least one controller bypass line 124, for example.

The frame detected as an intrusion may (but does not have to) be invalidated before an end-of-frame field of the frame. For example, a frame detected as an intrusion may be invalidated after arbitration and after transmission of an identifier. In this way, damage and/or a manipulation may be prevented before it is able to occur.

In node device 100 and/or in bus system 200, method 300 may be implemented in processor 130 of the at least one node device 100, and an intrusion into bus system 200 may thus be intercepted by the at least one node device 100. In particular, it is sufficient for method 300 to be implemented and applied in (only) one node of bus system 200. Method 300 may be a computer program which may be/is stored (as a signal sequence, for example) on a storage medium.

Method 300 for intercepting an intrusion into bus system 200, as presented in this disclosure, node device 100 and bus system 200 may relate to a Controller Area Network (CAN), a Local Interconnect Network (LIN) or a FLEXRAY network, it being possible in particular for the Controller Area Network to comprise a CAN (system) in one of the various versions and/or a CAN-inspired development. Method 300 for intercepting an intrusion into bus system 200 may be generalized to multibus systems, a multibus system comprising at least two bus systems, and the bus systems being coupled to one another by way of at least one gateway. From the perspective of each bus system of this type, the at least one gateway may be regarded as a node (e.g., with a plurality of receive lines and transmit lines, optionally with a plurality of controller bypass lines). Method 300 may be implemented, for example, in each gateway of the multibus system.

What is claimed is:

1. A computer-implemented method for a bus system, comprising the following steps:

obtaining, by a processor of an intrusion detection system of a first node and from a receive line of the first node, at least a portion of a frame sent by a second node of the bus system on a bus of the bus system, wherein the receive line branches at a branching point of the receive line into a first branch and a second branch downstream of the branching point, such that the first and second branches extend in parallel from a transceiver of the first node, with the first branch forming a line that extends from the transceiver directly to the processor of the intrusion detection system and the second branch forming a line that extends from the transceiver directly to a message processing controller of the first node, the at least the portion of the frame being received by the processor of the intrusion detection system of the first node over the first branch, the reception by the processor of the intrusion detection system thereby occurring in a manner that bypasses the message processing controller;

detecting, by the processor of the intrusion detection system and based on the at least the obtained portion of the frame, an intrusion into the bus system;

manipulating, by the processor of the intrusion detection system, a signal of the frame, of which the at least the portion had been obtained, the signal, as manipulated, being at a portion of the receive line that is upstream of the branching point on the receive line; and due to the manipulation, responding, by the message processing controller of the first node, to the frame, which is obtained by the message processing controller from the receive line, by:

generating an error frame; and placing the generated error frame onto a transmit line that extends between the message processing controller and the transceiver of the first node for transmission of the error frame onto the bus.

2. The method as recited in claim 1, wherein the manipulation of the signal includes:

overwriting each one of a number of recessive bits of the frame still arriving over the bus with a dominant bit; and/or setting a level on the receive line to a predefined level over a period of time.

3. The method as recited in claim 2, wherein the manipulation includes generating a sequence of directly successive dominant bits so that the sequence is received by the message processing controller of the first node from the receive line.

4. The method as recited in claim 3, wherein the error frame causes transmission of the frame corresponding to the detected as an intrusion to be invalidated and suppressed, and the intrusion into the bus system is thus intercepted.

5. The method as recited in claim 3, wherein the sequence of directly successive dominant bits leads to a negative result of a cyclic redundancy check by the message processing controller, thereby triggering, in accordance with the bus system protocol, the message processing controller to send the error frame onto the bus.

6. The method as recited in claim 2, wherein the manipulation of the signal includes the overwriting.

7. The method as recited in claim 2, wherein the manipulation of the signal includes the setting of the level on the receive line to the predefined level.

8. The method as recited in claim 1, wherein the detection by the processor of the intrusion detection system of the intrusion is based on the frame including an identifier that is assigned to a third node of the bus system.

9. The method as recited in claim 1, wherein the frame, of which the at least the portion was obtained by the processor of the intrusion detection system and based on which the intrusion was detected, is itself invalidated before an end-of-frame field of the obtained frame by the manipulation.

10. The method as recited in claim 1, wherein the branching of the receive line is such that a common line segment of the receive line, which is shared by the message processing controller and the processor of the intrusion detection system, branches to a controller bypass line that connects the processor of the intrusion detection system to the common line segment, the manipulation being performed by the processor of the intrusion detection system over the common line segment.

11. The method as recited in claim 1, wherein the bus system is a Controller Area Network (CAN) or a Local Interconnect Network (LIN) or a FLEXRAY network.

12. The method as recited in claim 1, wherein:
manipulation occurs before reception of the frame is complete, the at least portion of the frame being a first portion of the frame on the basis of which the detection is made, being based on a first portion of the frame; and
the manipulation is of a second portion of the frame so that the same frame on the basis of which the detection of the intrusion is made is itself modified by the processor of the intrusion detection system due to the detection.

13. A first node for a bus system, the first node comprising:
a transceiver configured to be connected to a bus of the bus system;
a message processing controller;
a processor of an intrusion detection system of the first node;
a receive line that branches at a branching point into a first branch and a second branch downstream of the branching point, such that the first and second branches extend in parallel from the transceiver, with the first branch forming a line that extends from the transceiver directly to the processor of the intrusion detection system and the second branch forming a line that extends from the transceiver directly to the message processing controller; and
a transmit line that extends between the message processing controller and the transceiver;

wherein:
the first node is configured for the processor of the intrusion detection system to:
obtain, from the first branch of the receive line of the first node, at least a portion of a frame sent by a second node of the bus system on the bus of the bus system, the at least the portion of the frame being received by the processor of the intrusion detection system of the first node over the first branch, the reception by the processor of the intrusion detection system thereby occurring in a manner that bypasses the message processing controller;
detect, based on the at least the obtained portion of the frame, an intrusion into the bus system; and
manipulate a signal of the frame, of which the at least the portion had been obtained, wherein the signal, as manipulated, is at a portion of the receive line that is upstream of the branching point of the receive line; and
due to the manipulation, the message processing controller is configured to respond to the frame, which is obtained by the message processing controller from the receive line, by:
generating an error frame; and
placing the generated error frame onto the transmit line for transmission of the error frame onto the bus.

14. The node device as recited in claim 13, wherein the bus system is a Controller Area Network (CAN) or a Local Interconnect Network (LIN) or a FLEXRAY network.

15. A bus system, comprising:
a bus;
a first node; and
a second node;
wherein:
the first node includes:
a transceiver connected to the bus of the bus system;
a message processing controller;
a processor of an intrusion detection system of the first node;
a receive line that branches at a branching point into a first branch and a second branch downstream of the branching point, such that the first and second branches extend in parallel from the transceiver, with the first branch forming a line that extends from the transceiver directly to the processor of the intrusion detection system and the second branch forming a line that extends from the transceiver directly to the message processing controller; and
a transmit line that extends between the message processing controller and the transceiver;
the first node is configured for the processor of the intrusion detection system to:
obtain, from the first branch of the receive line of the first node, at least a portion of a frame sent by the second node of the bus system on the bus of the bus system, the at least the portion of the frame being received by the processor of the intrusion detection system of the first node over the first branch, the reception by the processor of the intrusion detection system thereby occurring in a manner that bypasses the message processing controller;
detect, based on the at least the obtained portion of the frame, an intrusion into the bus system; and manipulate a signal of the frame, of which the at least
the portion had been obtained, wherein the signal,
as manipulated, is at a portion of the receive line
that is upstream of the branching point of the
receive line;

due to the manipulation, the message processing con-
troller is configured to respond to the frame, which
is obtained by the message processing controller
from the receive line, by:

generating an error frame; and placing the generated error frame onto the transmit
line for transmission of the error frame onto the
bus; and the second node also includes a further transceiver, a
further message processing controller, and a further
processor of a further intrusion detection system.

16. The bus system as recited in claim 15, further com-
prising at least one third node of the bus system.

17. The bus system as recited in claim 15, wherein the bus
system is a Controller Area Network (CAN) or a Local
Interconnect Network (LIN) or a FLEXRAY network.

\* \* \* \* \*